(12) United States Patent
Kahl

(10) Patent No.: US 7,264,416 B2
(45) Date of Patent: Sep. 4, 2007

(54) HOLLOW CHAMBER PROFILE SYSTEM FOR PRECISION SUPERSTRUCTURES

(76) Inventor: Helmut Kahl, Fossbrink 2, Porta Westfalica (DE) 32457

( * ) Notice: Subject to any disclaimer, the term of this patent is extended or adjusted under 35 U.S.C. 154(b) by 186 days.

(21) Appl. No.: 10/495,214

(22) PCT Filed: Nov. 21, 2002

(86) PCT No.: PCT/EP02/13066

§ 371 (c)(1),
(2), (4) Date: May 12, 2004

(87) PCT Pub. No.: WO03/044376

PCT Pub. Date: May 30, 2003

(65) Prior Publication Data

US 2005/0008430 A1   Jan. 13, 2005

(30) Foreign Application Priority Data

Nov. 22, 2001  (DE) .......................... 201 19 047 U

(51) Int. Cl.
F16B 7/18 (2006.01)
F16B 12/50 (2006.01)
H02B 1/01 (2006.01)

(52) U.S. Cl. .................... 403/187; 403/231; 403/384; 403/388; 403/403; 211/182; 211/192; 269/900; 52/656.9

(58) Field of Classification Search ................ 403/187, 403/231, 384, 388, 403; 211/182, 192; 269/300, 269/900; 52/656.9
See application file for complete search history.

(56) References Cited

U.S. PATENT DOCUMENTS 3,332,374 A * 7/1967 Ferdinand et al. .......... 211/182

(Continued)

FOREIGN PATENT DOCUMENTS

| DE | 3401698 A1 | * | 8/1985 |
|---|---|---|---|
| DE | 9004573.4 U | * | 8/1990 |
| DE | 92 16 764.0 U1 | | 3/1993 |
| DE | 298 18 011 U1 | | 3/1999 |
| EP | 0 016 865 A1 | | 10/1980 |
| FR | 1007385 A | * | 5/1952 |
| FR | 1 596 253 | | 6/1970 |
| FR | 1 386 323 | | 10/1980 |
| JP | 02-285130 A | * | 11/1990 |

*Primary Examiner*—Daniel P. Stodola
*Assistant Examiner*—Ernesto Garcia
(74) *Attorney, Agent, or Firm*—Browdy and Neimark PLLC

(57) ABSTRACT

A hollow chamber profile system for precision superstructures for gauges, measuring and control devices, and all types of devices, having first bore holes (9) which are arranged in a defined modular dimension, and second bore holes (11) which are arranged, in the same modular dimension, on a plane which is rotated by 90 degrees in relation to the plane of the first bore holes (9), are used to receive connecting and/or fixing elements with threaded parts (15) comprising screw threads (16), the diameter of said threaded parts corresponding to the bore holes (9), and in which screws (17) are received. The system has a rectangular or quadratic cross-section, with outer walls (3) comprising vertical bore holes (9) which are perpendicular to each other. The hollow chambers (2) are formed by inner walls (4), by inner walls (4) and outer walls (3), or by outer walls (3), and the connecting and fixing elements comprise guiding elements (13) and adapters (18, 18').

17 Claims, 6 Drawing Sheets

U.S. PATENT DOCUMENTS

Figure 1:
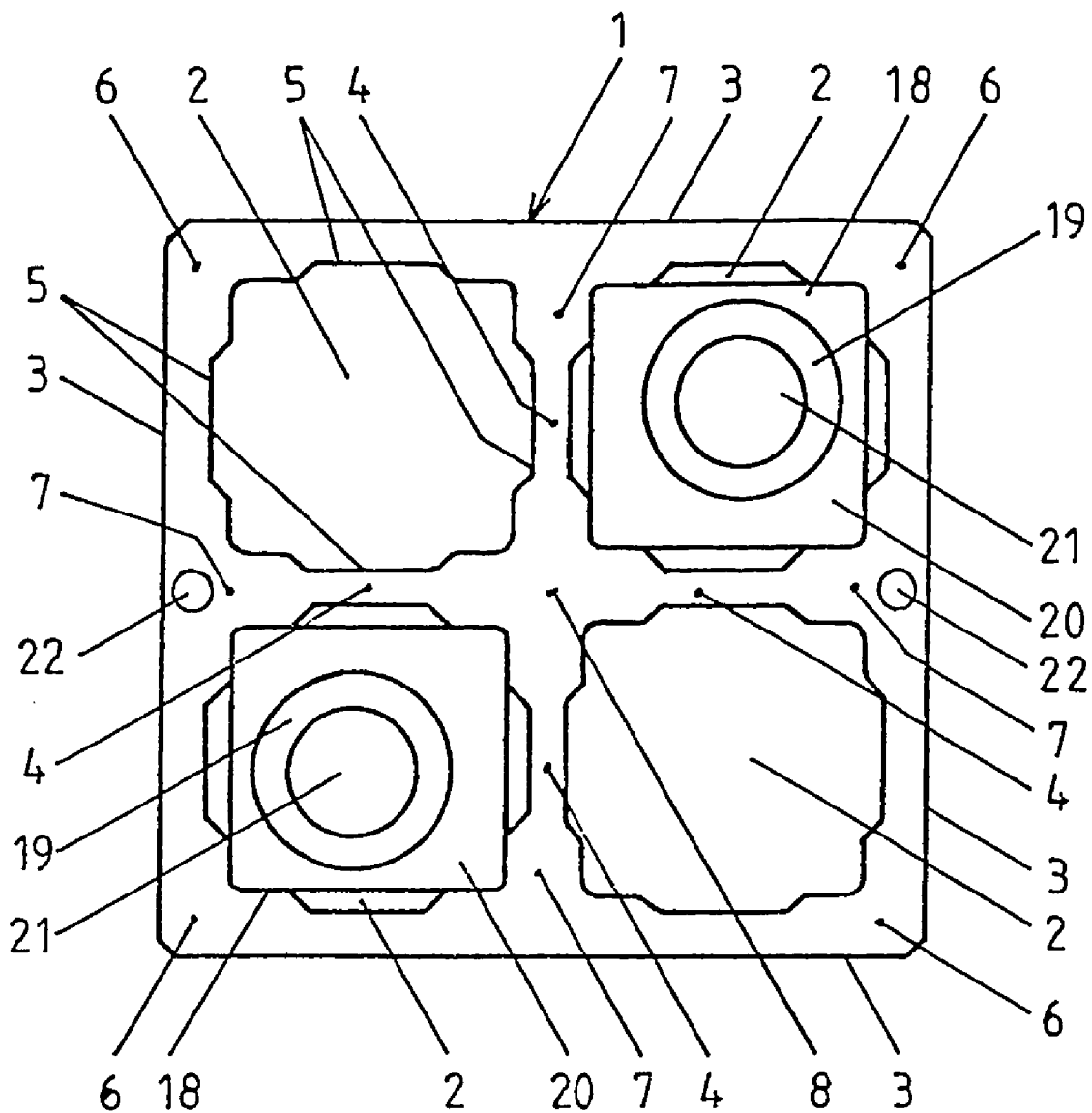

| | | | | |
|---|---|---|---|---|
| 3,415,554 A | * | 12/1968 | Papayoti | 403/187 |
| 4,886,257 A | * | 12/1989 | Witte | 269/900 |
| 4,981,388 A | * | 1/1991 | Becken et al. | 403/403 |
| 5,363,625 A | * | 11/1994 | Philippi | 52/656.9 |
| 5,371,988 A | * | 12/1994 | Hannes | 52/656.9 |
| 5,536,097 A | * | 7/1996 | Hazan | 29/525.02 |
| 5,729,948 A | * | 3/1998 | Levy et al. | 403/187 |
| 5,887,733 A | * | 3/1999 | Harvey et al. | 211/182 |
| 6,503,020 B1 | * | 1/2003 | Mascioletti et al. | 403/231 |
| 6,926,613 B1 | * | 8/2005 | Binning | 403/231 |

* cited by examiner

HOLLOW CHAMBER PROFILE SYSTEM FOR PRECISION SUPERSTRUCTURES

The present invention is concerned with a hollow chambered section system for precision set-ups for gauges, measuring and control instruments, as well as devices of all kinds, comprising first bores, which are arranged in a defined grid spacing, additional second bores, which are arranged in the same grid spacing on a plane that is rotated by 90° relative to the plane of the first bores, to receive connecting and/or fixing means with threaded elements incorporating a thread, the diameter of which corresponds to the bores, and in which bolts are received, said system having a rectangular or square cross section, the outer walls of which comprise the bores, which are perpendicular to one another.

For precision set-ups, especially for gauges, measuring and control devices, for example so-called "master stands" in the automobile industry, special requirements exist for highly precise set-ups, exact repeating accuracy of the boundary conditions, such as, e.g., a defined high torsion and flexural strength of the carrier components, minimal centering tolerances, and a high degree of antitorsion properties.

From DE 92 16 764, a cuboid tube is known with cross bores and close-tolerance bores, as well as with webs having indentations for connecting elements.

To meet the above mentioned requirements, however, measures are required that result in an uneconomical increase in the material thickness and, hence, in the dimensions and weight. A further shortcoming lies in the assembly of the divided connecting elements, as they are fully encompassed in the bores only on one side, with the other end resting in an indentation of a web; which, in certain positions in which the support surface is located on top, for example, can result in assembly problems. Additionally, the indentations in the webs for the required precision are not particularly economical to produce as they require multiple processing steps.

It is an additional shortcoming that the centering and antitorsion properties are not present to the required high degree of precision.

It is the object of the invention to create a section system for precision set-ups that eliminates the above shortcomings and provides the required precision while at the same time providing an improved economic efficiency in the production, material and assembly, while meeting the required narrow tolerances for centering and antitorsion properties.

This object is met according to the invention in such a way that the hollow chambers are formed by inner walls, and by inner walls and outer walls, or by outer walls, and the connecting and fixing means incorporate guide elements and adapters.

The characteristics of the subclaims represent advantageous improvements of the inventive solution.

The hollow chambered section consists of evenly arranged hollow chambers of identical size, which are separated by inner walls within outer walls that form a rectangular, preferably square cross section.

The inner walls are positioned perpendicular on the outer walls in each case and connected to them. At the same time, they form a right-angled intersection in the center of the section.

The insides of the hollow chambers are provided with regular recesses, reducing these regions of the chamber walls in their wall thicknesses. In this manner, regular regions with different wall thicknesses are obtained. The thinnest wall thicknesses occur in the center regions of the side walls of the hollow chamber. Short transitional areas exist toward the corners until the wall thickness reaches its widest width. This results in partial areas with increased cross sections, which are caused by the outer walls meeting the outer walls in the corner areas, the inner walls meeting the outer walls in the connecting regions, and the inner walls forming intersecting regions.

This creates a hollow chambered section with a high degree of torsional and bending stiffness and simultaneous low use of material, low weight and small dimensions. The hollow chambered section is advantageously produced by means of an extrusion molding process, as this type of production results in a high degree of accuracy since the wall thicknesses are identical in sectional planes perpendicular to them.

The hollow chambered section is additionally provided with bores in a defined grid spacing, wherein the planes of said bores are located perpendicular to each another. These bores are located in the outer walls and bores that are aligned with the former are provided in the inner walls. Since the bores are aligned and of identical diameters and tolerances, they can be produced by the most simple economical production with a high degree of precision.

In a particularly advantageous design, the bores are provided only in those places in the hollow chambered section where they are needed based on their application. It is thus possible to provide bores either over the entire hollow chambered section, only in its edge regions, and/or in suitable places.

It is also possible to place the bores outside a grid spacing, thus resulting in an advantageous increase in versatility.

It is also conceivable that different bore diameters could be used, with accordingly adapted connecting, fixing and antitorsion means.

The connecting, fixing and antitorsion means consist of cylindrical threaded and guide elements, bolts and adapters, wherein the cylindrical threaded and guide elements are received and fully encompassed by the outer and inner wall bores. They do not merely rest in them on one side but they are supported radially in all directions, resulting in an advantageously facilitated and simplified assembly.

The fastening takes place by means of bolts, which are guided inside guide bores in the guide elements and screwed into threads of the threaded elements. Between the threaded elements and guide elements, adapters with guide bores are inserted for the bolts. In the case of right-angled connections of hollow chambered sections, these adapters have rectangular and cylindrical centering projections, with the right-angled centering projections being inserted into the hollow chambers and the cylindrical centering projections being received in outer wall bores of the hollow chambered section. This produces a centering of the connecting and guide elements, as well as a particularly advantageous antitorsion protection of the hollow chambered sections relative to one another.

In the case of non-right-angled connections of hollow chambered sections, for example overlappings of two hollow chambered sections, the adapters are provided with two cylindrical centering projections of different or identical diameters corresponding to the outer wall bore dimensions of the hollow chambered sections. In this case, too, an advantageous centering and antitorsion protection is achieved for the hollow chambered sections relative to one another.

An additional advantageous design of the antitorsion protection of right-angled hollow chambered sections results when a preferred grid spacing is used for the bores wherein the placement of the cylindrical centering projections on the right-angled centering projections of the adapters is off-center. This results in a large center distance of the cylindrical centering projections, which increases the stability of the antitorsion protection.

It is advantageous to provide the cylindrical centering projections of the adapters in their upper region with a cylindrical recess corresponding to the diameter of the guide elements, as this produces an added advantageous form-fitting centering of the connecting and fixing means.

An additional advantageous embodiment provides for the guide bores of the guide elements to be provided with depressions corresponding to the cylindrical heads of the fastening bolts. This results in an additional improvement of the centering of the connecting and fixing means and hollow chambered sections, wherein, furthermore, the adjacent hollow chamber regions, especially those located above the bolt head, remain free to receive additional connecting means.

It is particularly advantageous in this context that conventional bolts are used in lieu of close-tolerance bolts.

In an additional advantageous simple embodiment, the adapters with the rectangular main body and cylindrical attachment are eliminated if a lower precision is required. They are then replaced by simple cylinder or alignment pins, which are received in simple location holes. These functions may also be performed by adapter sleeves or the like. As a result, a simple but advantageously effective antitorsion protection for the hollow chambered sections is made possible in this case as well.

Figure 2:
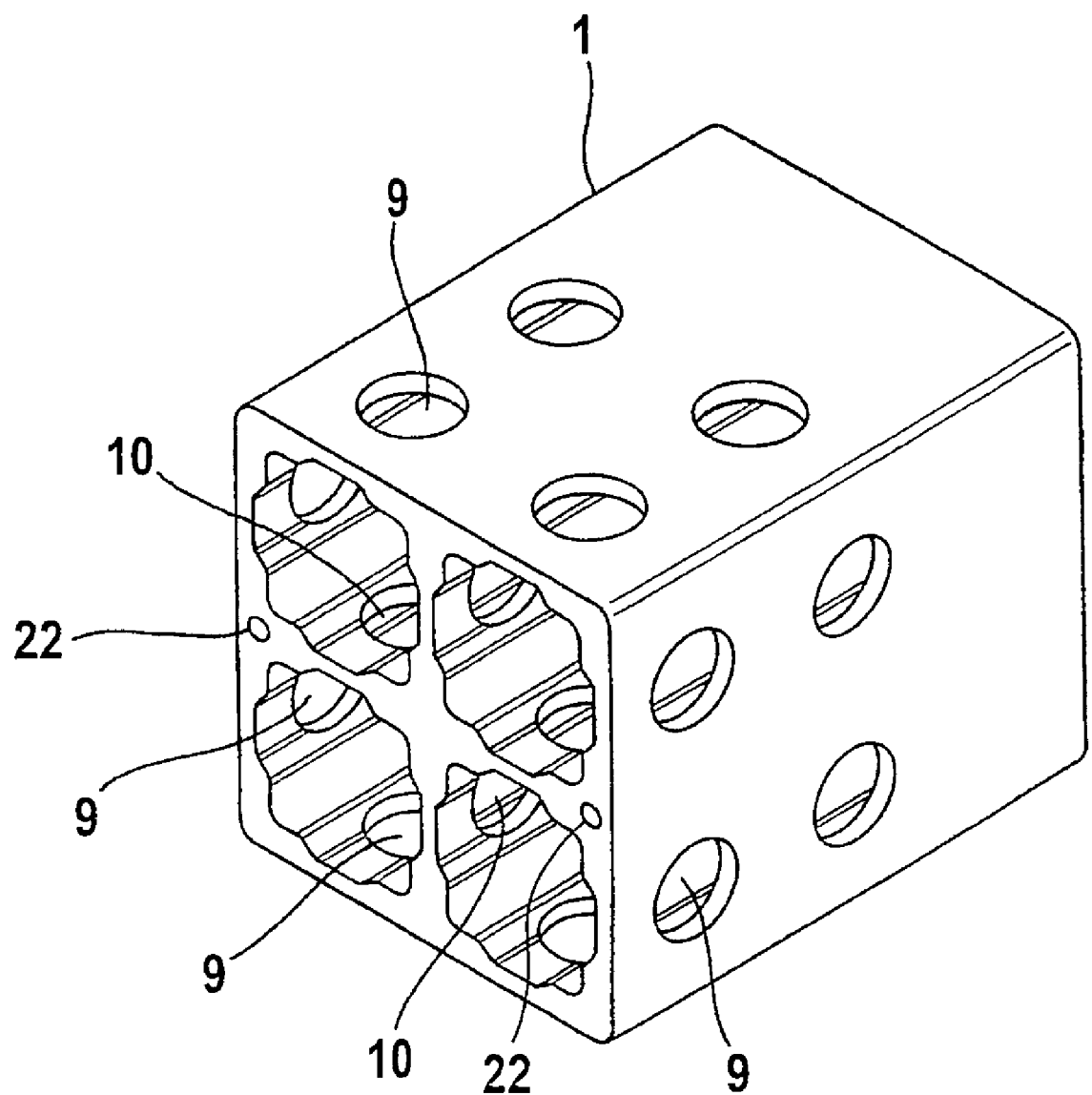
Figure 3:
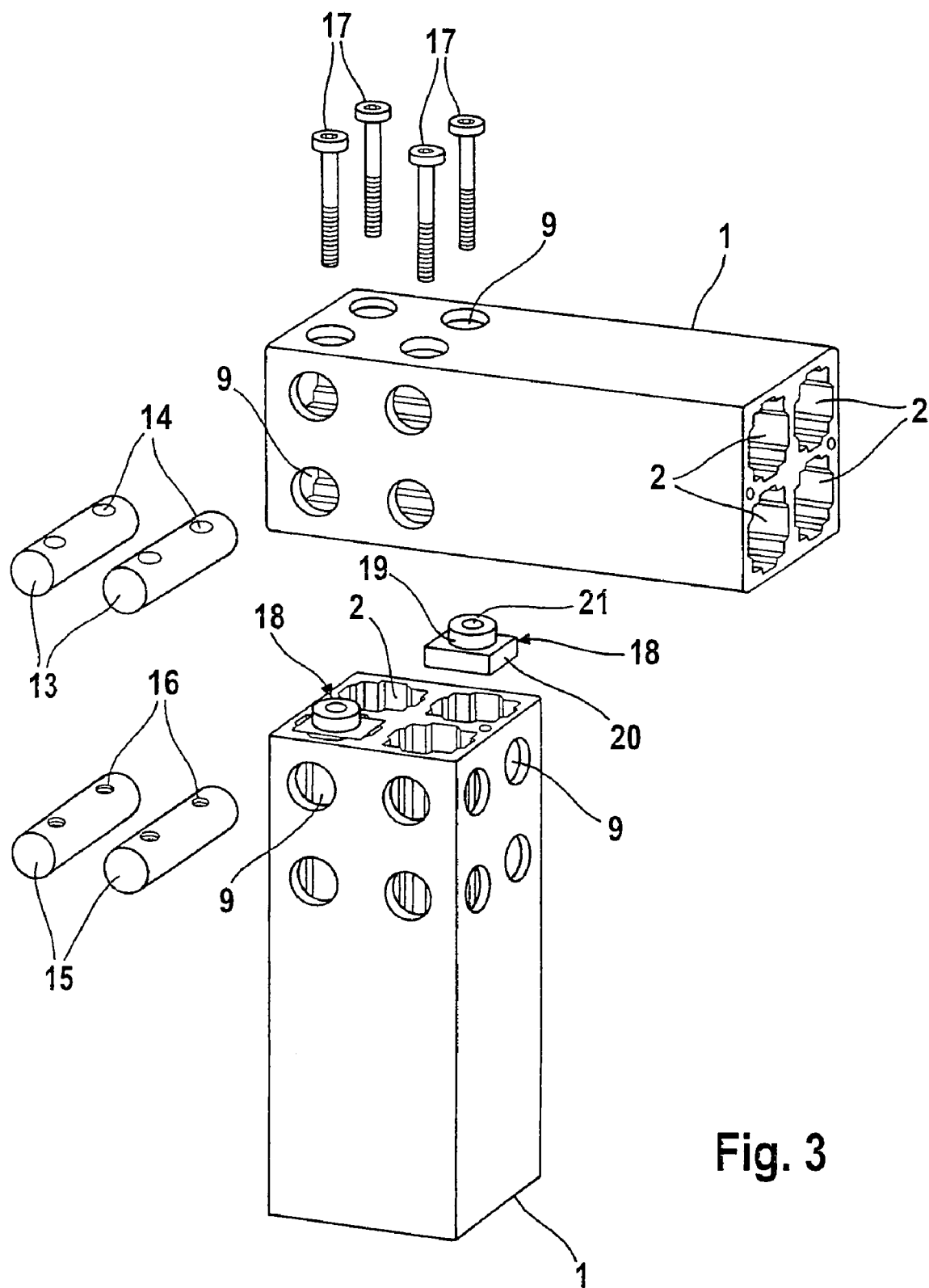
Figure 4:
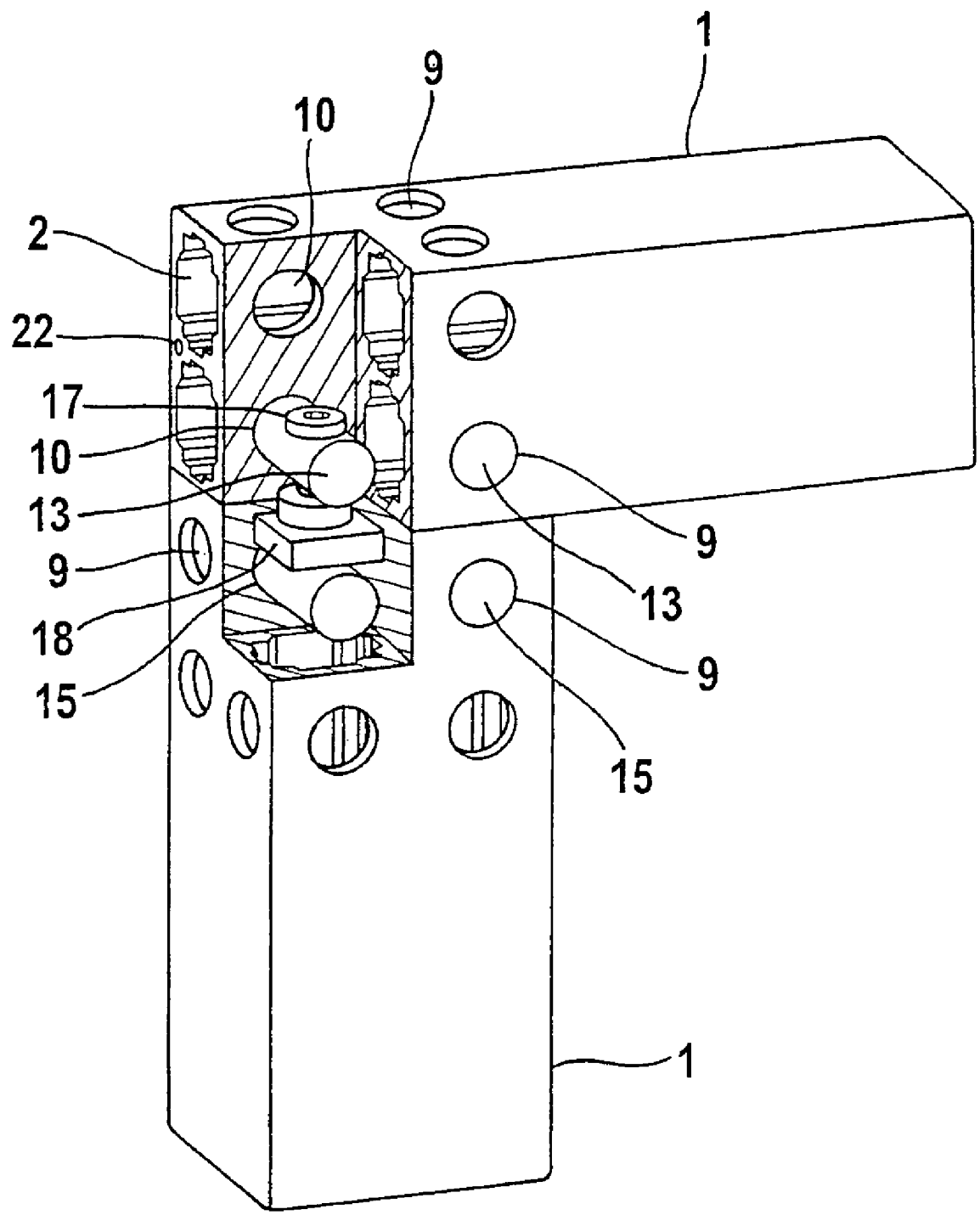
Figure 5:
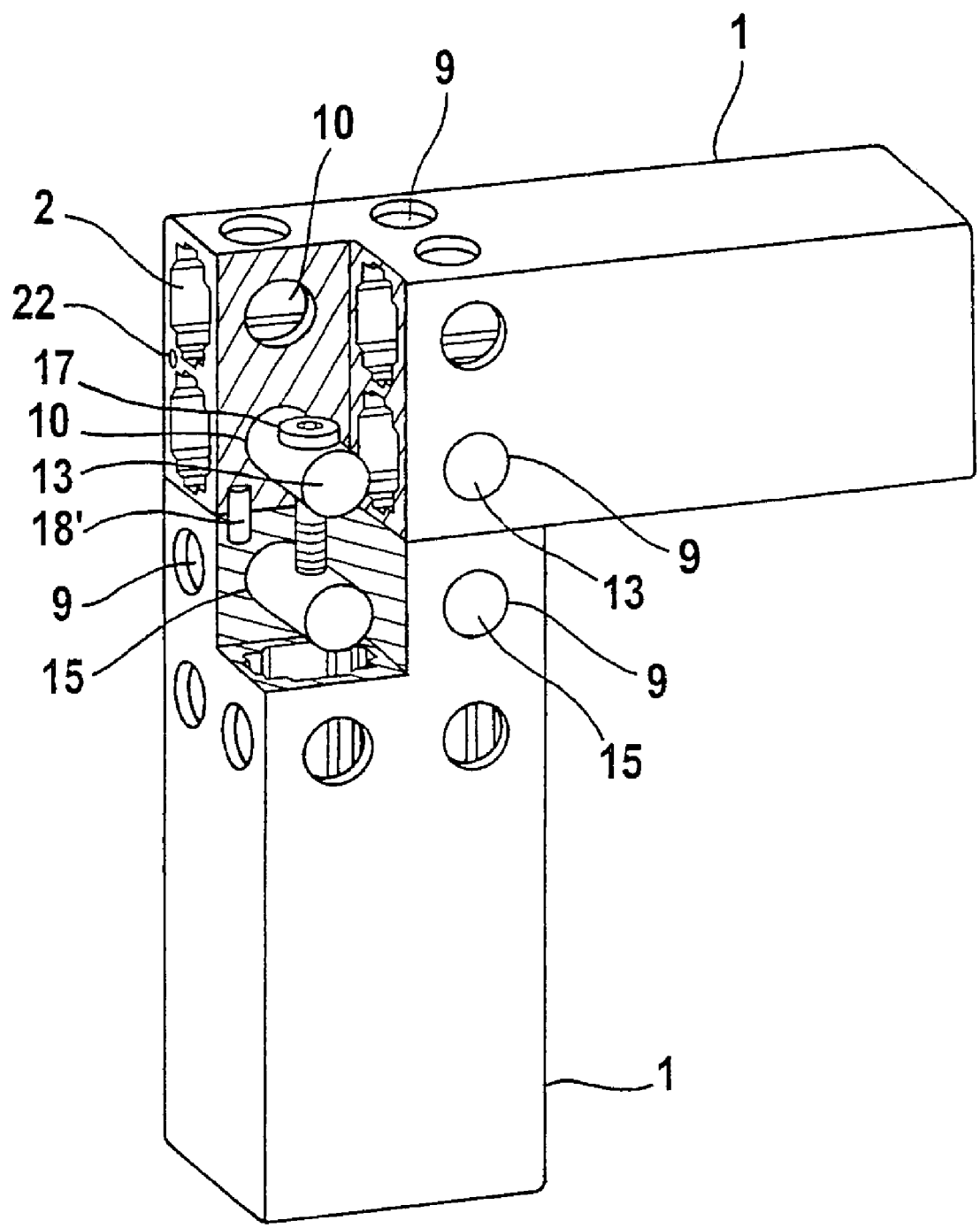

An embodiment according to the invention will be explained below with the aid of the drawings, in which:

FIG. 1 shows the cross section of a hollow chambered section in one possible embodiment in a front view with two inserted adapters for antitorsion protection, FIG. 2 shows a view in the perspective of a hollow chambered section according to FIG. 1, FIG. 3 shows an exploded view of two hollow chambered sections as a system with connecting, fixing and antitorsion means for a right-angled connection, FIG. 4 shows a view in the perspective and partially cut open of the hollow chambered section system according to FIG. 3 in its assembled state, FIG. 5 shows the view according to FIG. 4, however, with different adapters, and FIG. 6 shows additional possible embodiments of hollow chambered sections.

FIG. 1 represents the cross section of an example embodiment of a hollow chambered section 1. Shown are four hollow chambers 2, which are arranged in a square cross section formed by outer walls 3. The hollow chambers 2 are separated from one another by inner walls 4, which, in the shown cross section, form a cross.

The insides of the walls 3, 4, of the hollow chambers 2 have recesses 5 of identical size, resulting in each case in a reduction in the wall thickness in these regions of both the inner walls 4, as well as the outer walls 3. Relative to these regions, widened regions of the walls thus result, especially in the regions of the corners 6 of the outer walls 3, the connecting regions 7 of the inner walls 4 to the outer walls 3, and the intersection 8 of the inner walls 4.

In the shown cross section example, the recesses 5 are located in each case centrical on each inside of a hollow chamber 2, having approximately half of the length of one inside, their depth being approximately $1/12$ of its length, their edges being rounded and extending at an angle of approximately 45°. All hollow chambers 2 have a symmetrical cross section of identical size.

Additionally, FIG. 1 shows two adapters 18, which incorporate a rectangular centering projection 20 and disposed on same a cylindrical centering projection 19, which are inserted with their rectangular centering projection 20 in each case into the upper face-end region of a hollow chamber 2. They are disposed diagonal. Not shown is the option of providing all hollow chambers 2 with adapters 18.

The cylindrical centering projections 19 are disposed off-center from the rectangular centering projection 20 to correspond to a preferred grid spacing of corresponding outer wall bores 9 of a hollow chambered section 1 being connected. The arrangement of the adapters 18 in the shown example embodiment in the preferred grid spacing results in a large spacing of the center lines of the cylindrical centering projections 19 in the diagonal of the cross section of the hollow chambered section 1.

If a different grid spacing is used, the adapters 18 may be adjusted, for example, by simple 90° rotations about the longitudinal axis of the hollow chamber 2. Adapters 18 with cylindrical centering projections 19 that correspond to the given grid spacing and to the dimensions of the bores 9 are also possible. Additionally, the section incorporates location holes 22 that serve to receive adapters 18 if a simple antitorsion protection is sufficient. The adapters 18 would then be eliminated.

Additional functions of the adapters 18 will be presented and explained in conjunction with the other figures.

FIG. 2 shows a view in the perspective of a hollow chambered section 1 with outer wall bores 9 and inner wall bores 10 that are aligned with the former, with the planes of the given aligned bores 9 and 10 positioned perpendicular on one another. The bores 9, 10 serve to receive connecting, fixing and/or centering and antitorsion means as will be shown and explained in the figures below.

An exploded view of two hollow chambered sections 1 is shown in FIG. 3 as a system with connecting, fixing and antitorsion means for a right-angled connection.

The connecting and fixing means consist of cylindrical guide elements 13 with guide bores 14, which incorporate depressions, which are not shown, for the bolt heads of the bolts 17; also of cylindrical threaded elements 15 with thread 16, as well as of the adapters 18, which serve as antitorsion protection for the hollow chambered sections 1 relative to one another.

Their other functions will be explained further below.

To connect the hollow chambered sections 1 the threaded elements 15 are first inserted into the face-end bores 9 of the hollow chambered section 1 and aligned such that the center axes of the threads 16 are oriented in the longitudinal direction of the hollow chambers 2. The adapters 18 are inserted with their right-angled centering projections 20 into the hollow chambers 2 of the hollow chambered section 1 at the face ends in such a way that the right-angled centering projections 20 rest with their undersides on the threaded elements 15, and their upper sides are aligned with the face end of the hollow chambered section 1 and do not project beyond it.

The additional hollow chambered section 1 being connected is placed upon the first hollow chambered section 1, which has been prepared as described above, in such a way that the cylindrical centering projections 19 of the adapters 18 are encompassed by the corresponding outer wall bores 9 of the hollow chambered section 1 in a form-fitting manner. This results in a particularly advantageous form-fitting antitorsion protection for the hollow chamber sections 1 that have been connected to one another at right angles in this manner.

To fasten the hollow chambered sections 1 to one another, the guide elements 13 are now inserted into the bores 9 and aligned such that the longitudinal axes of their guide bores 14 are aligned with the longitudinal axes of the bores 9.

This is shown in FIG. 4 in the assembled state in a partially cut-open view.

The cylindrical centering projections 19 of the adapters 18 have on their upper side a cylindrical recess, which is not shown. This corresponds to the outer diameter of the guide elements 13 which, in the assembled state, are received form-fittingly in these recesses.

The frictional securing of the hollow chambered sections 1 being connected is performed by means of bolts 17, which engage through the bores 9 through the guide bores 14 of the guide elements 13, as well as through the guide bores 21 of the adapters 18, into the threads 16 of the threaded elements 15 and, by means of a suitable tool, are tightened through the bores 9. This results in a frictional and form-fitting torsion-proof interconnection of the hollow chambered sections 1 which at the same time is also centered, as will be described below.

The guide elements 13 and threaded elements 15 may be implemented as one piece and/or multiple pieces, depending on the width and intended application of the section. They are received and fully encompassed in at least two bores 9-9, 9-10 in such a way that the cylindrical member penetrating the bores corresponds to the bore diameters and penetrates the bores in their entire or nearly entire length. In the shown embodiment the guide elements 13 and threaded elements 15 extend over the entire width of the hollow chambered section 1 in such a way that they are, in this embodiment, received and fully encompassed by two outer wall bores 9 and one inner wall bore 10, i.e., by altogether three bores 9-10-9.

The heads of the bolts 17 are received in depressions, which are not shown, of the guide bores 14 of the guide elements 13, resulting in the segments of the hollow chamber 2 that are located above them to remain free to receive additional connecting and/or fixing means.

At the same time, this and the guiding of the bolts 17 inside the guide bores 21 of the adapters 18 results in a centering of the guide elements 13 and thread 15 in such a way that they are always received and fully encompassed to the same degree in both outer wall bores 9 along their entire or nearly entire lengths.

The adapters 18 thus fulfill a triple function:
(a) centering of the connecting and fixing means 13, 15, 17,
(b) antitorsion protection for the hollow chambered sections 1 relative to one another,
c) centering of the hollow chambered sections 1 relative to one another.

For non-right-angled connections, such as overlaps, the adapters 18 may be designed fully cylindrical. For applications of lesser precision, the adapters 18 may also be eliminated.

The invention is not limited to the shown embodiments. To implement a simple antitorsion protection, the adapters 18' are disposed in the location holes 22, as shown in FIG. 5. The adapters 18' are alignment pins, for example, which can be inexpensively acquired as standard parts. They may also be adapter sleeves, or the like.

Figure 6E:
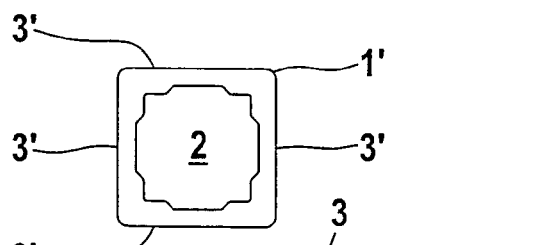
Figure 6D:
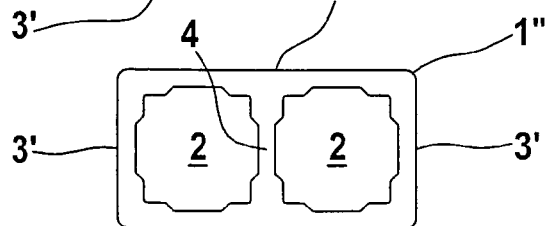
Figure 6C:
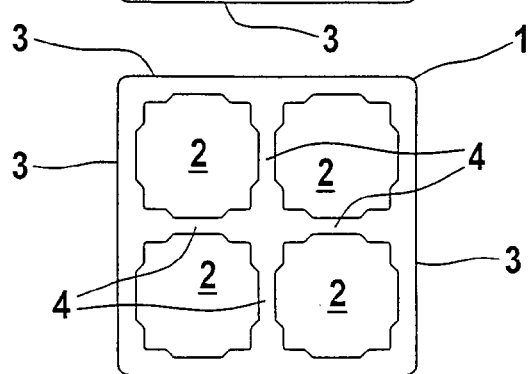
Figure 6B:
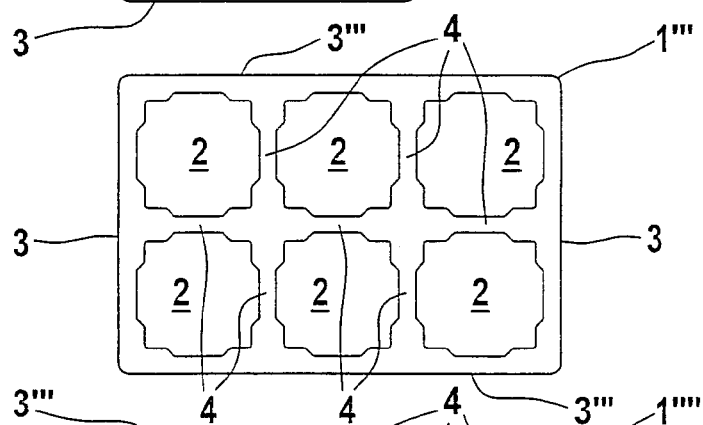
Figure 6A:
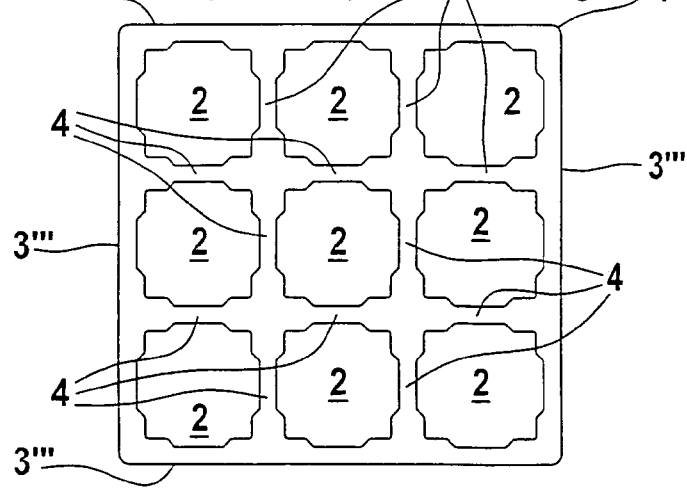

An additional example arrangement of hollow chambers 2 into hollow chambered sections 1'''' is shown in FIG. 6A, where the hollow chambers 2 are formed by inner walls 4, and by inner walls 4 and outer walls-3'''. FIGS. 6B through 6D show that the hollow chambers 2 are formed by inner walls 4 and outer walls 3, 3' and 3''' respectively, whereas FIG. 6E represents a special case in which the hollow chamber 2 is formed by outer walls 3'.

Additional embodiments are conceivable; the invention is not limited to the presented examples.

What is claimed is:

1. A hollow chambered section system for precision set-ups for gauges, measuring and control instruments, comprising:
    at least a pair of hollow chambered sections each having a rectangular cross section and a plurality of chambers with open ends formed by outer walls (3) and inner walls (4);
    each of the hollow chambered sections having at least one bore (9, 10) on each of the outer walls (3) and the inner walls (4) that are coaxial with the bores on any parallel outer wall and any parallel inner wall of the outer and the inner walls;
    wherein said hollow chambered sections being engaged together by at least one connecting apparatus to form the section system,
    the connecting apparatus each comprising a cylindrical threaded element (15) having a threaded hole (16),
    a cylindrical guide element (13) having a through hole (14), and
    at least one adapter (18) having a guide bore (21) therethrough and a bolt (17),
    the threaded element (15) and the guide element (13) both having a diameter substantially equal to the bore,
    wherein the connecting apparatus connects the chambered sections together wherein the adapter is engaged in the open end of a chamber in a first of the chambered sections, the cylindrical threaded element (15) is engaged in a set of coaxial bores in the first chambered section below the adapter, the guide element (13) is engaged in a set of coaxial bores in a second of the chambered sections, and the set of coaxial bores in the first chambered section are aligned with that of the second chambered section and the bolt (17) is extended through the through hole (14) of the guide element (13), the guide bore (21) of the adapter is extended into the threaded hole (16) of the cylindrical threaded element (15) and the bolt in the threaded hole has been tightened to draw the connecting apparatus together.

2. A hollow chambered section system according to claim 1, characterized in that the inner walls (4) are engaged at right angles to the outer walls (3) and connected to same.

3. A hollow chambered section system according to claim 1, characterized in that the inner walls (4) are crossed at right angles.

4. A hollow chambered section system according to claim 1, characterized in that each chamber (2) has recesses (5) on inner sides thereof.

5. A hollow chambered section system according to claim 1, characterized in that corners (6) of the outer walls (3) have a thickness greater than a mid-portion of the outer walls.

6. A hollow chambered section system according to claim 1, characterized in that connecting regions (7) of the inner walls (4) to the outer walls (3) have a thickness greater than a mid-portion of the inner walls.

7. A hollow chambered section system according to claim 1, characterized in that intersections (8) of the inner walls (4) have a thickness greater than a mid-portion of the inner walls.

8. A hollow chambered section system according to claim 4, characterized in that the thickness of the cross sections of the corners (6), connecting regions (7), and intersections (8) relative to the inner and outer walls are created by the recesses (5).

9. A hollow chambered section system according to claim 1, characterized in that wall thicknesses of opposed walls (3, 4) are identical in perpendicular sectional planes.

10. A hollow chambered section system according to claim 1, characterized in that all the chambers (2) have the same cross section.

11. A hollow chambered section system according to claim 1, characterized in that all inner walls (4) have the same section shape.

12. A hollow chambered section system according to claim 1, characterized in that the chambers (2) form, in the longitudinal direction, receptacles for connecting, fixing, guiding and centering means with corresponding cross sections.

13. A hollow chambered section system according to claim 1, wherein the outer walls and the inner walls have a plurality of the bores (9, 10) arranged in the same grid spacing on each of the walls.

14. A hollow chambered section system according to claim 1, wherein the adapter has a centering portion (20) which corresponds to and engaged in any of the open ends of the chambers.

15. A hollow chambered section system according to claim 13, wherein the adapter has a centering projection (19) which corresponds to and is engageable in any of the bores.

16. A hollow chambered section system according to claim 13, wherein the system includes a plurality of the connecting apparatus.

17. A hollow chambered section system according to claim 16, wherein the cylindrical element (15) has two threaded holes at opposite ends thereof and the guide element (13) has two through holes (14) at opposite ends thereof.

* * * * *